INVENTOR
WILLIAM E. J. MOSS
AGENT
Murphey & Erickson

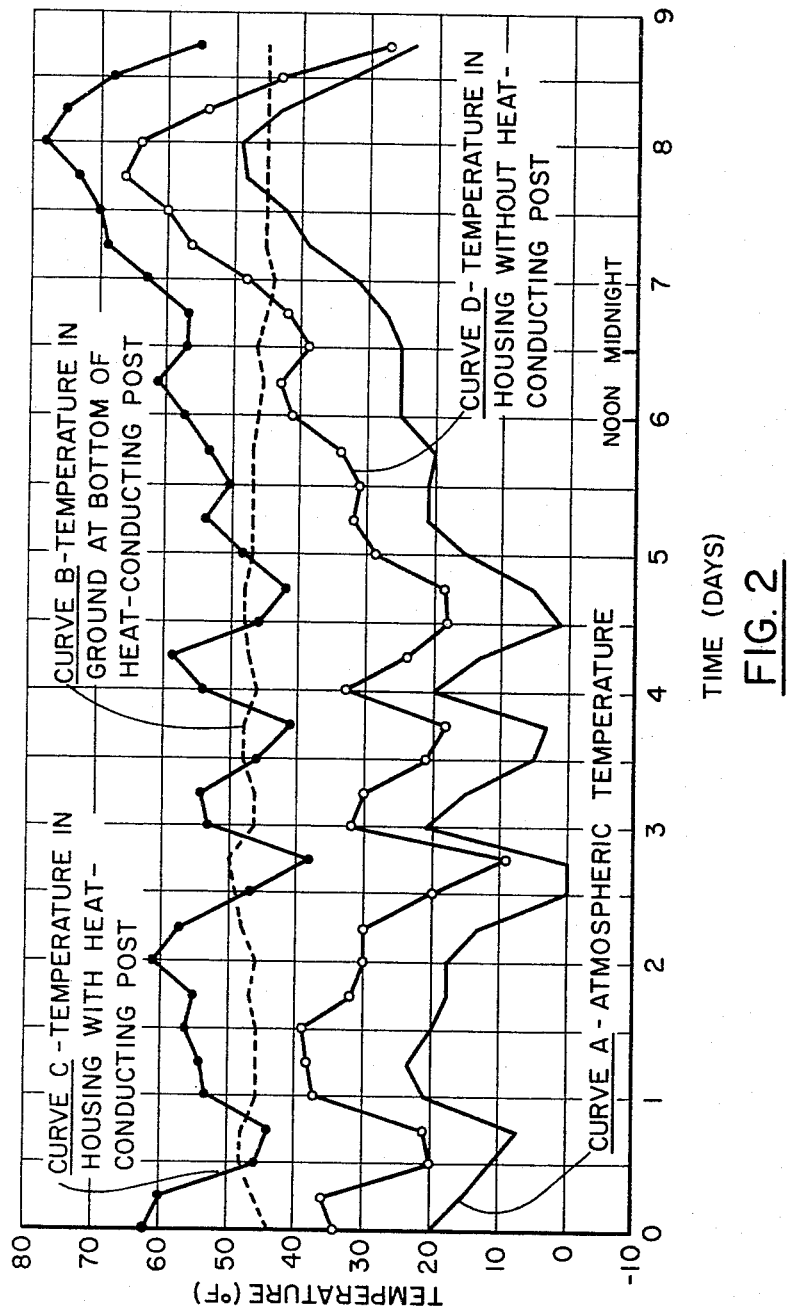

United States Patent Office 3,330,333
Patented July 11, 1967

3,330,333
TEMPERATURE CONTROLLING OUTDOOR ENCLOSURE FOR COMMUNICATIONS APPARATUS
William E. J. Moss, Ottawa, Ontario, Canada, assignor to Northern Electric Company Limited, Montreal, Quebec, Canada
Filed Oct. 7, 1965, Ser. No. 493,785
Claims priority, application Canada, Dec. 24, 1964, 919,584
11 Claims. (Cl. 165—45)

ABSTRACT OF THE DISCLOSURE

A housing mounted on a heat conducting aluminum post to use the ground as a heat source and a heat sink for controlling the effect of atmospheric conditions on the environmental temperature of communications apparatus in the housing.

---

Figure 1:
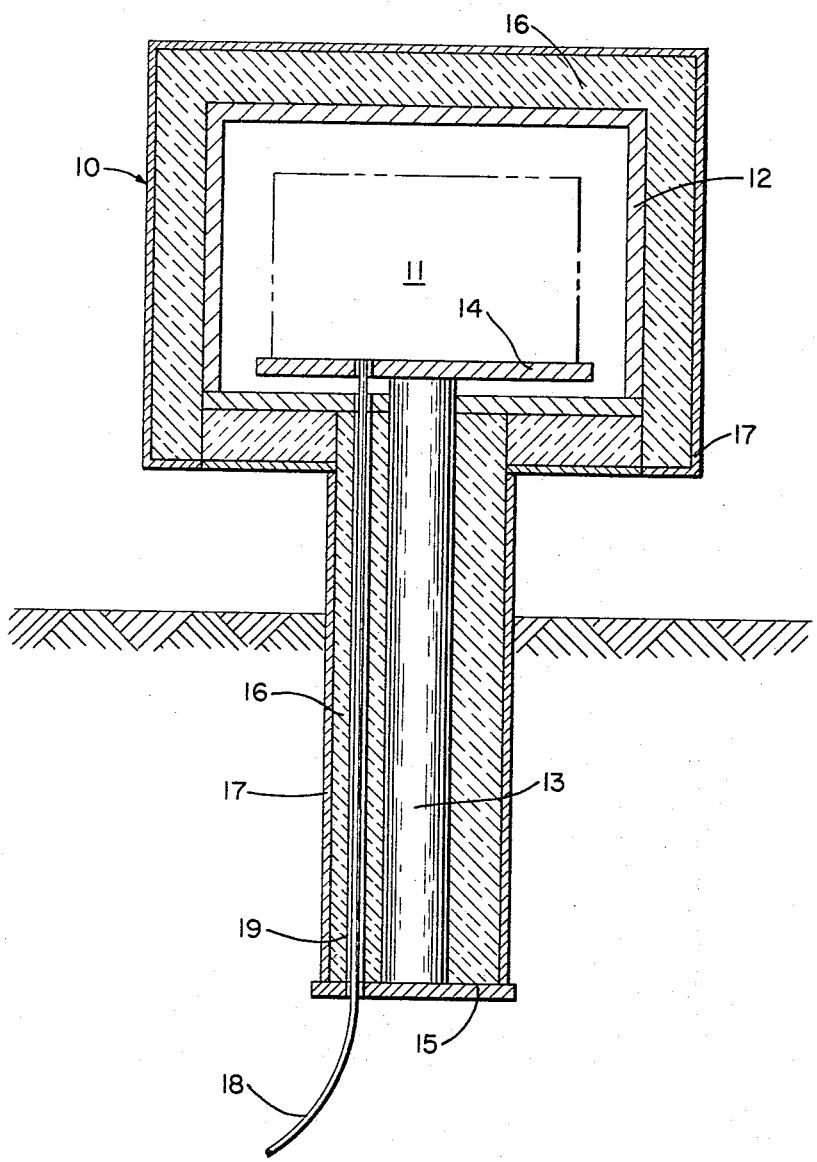

This invention relates to enclosures for outdoor installations of equipment, such as communications apparatus, and to means for controlling the effect of atmospheric temperature on the temperature inside the enclosure.

Temperature-sensitive equipment such as communications apparatus is often installed outdoors where the temperatures or variations of temperature may exceed the acceptable operating conditions for the equipment. In such cases, the equipment must be protected from the effects of these extreme temperature conditions. An obvious step, of course, is to mount the equipment in a well-insulated enclosure. But often this is not enough and additional means for controlling the temperature inside the enclosure is required.

One solution to this problem which is likely the first to come to mind is to provide separate power-operated equipment in the enclosure for heating or cooling as the case may be. This is not generally acceptable for economic reasons. Nor is the alternative solution of installing the equipment below ground acceptable because it prevents ready access to the equipment for maintenance under all weather conditions.

The present invention proposes a simple and economical solution for adding or subtracting heat in the enclosure that does not require the use of power and yet permits the equipment to be accessible at all times. This is achieved by mounting the enclosure above ground and by extending a member of heat conducting material from the interior of the enclosure to a medium of more desirable temperature conditions. The most convenient medium is usually a natural one such as the ground. Thus, any difference in temperature between the enclosure and the medium results in heat being conducted through the member. With the member being suitably insulated to minimize heat losses, the effect of the atmospheric temperature on the temperature inside the enclosure, and hence on the equipment, can usually be limited to the desired operating conditions for the equipment.

In one form of the invention, plates of heat conducting material are mounted on the member to enhance the transmission of heat to and from the member in the enclosure and in the medium.

A preferred embodiment of the invention is described below with reference to the accompanying drawings in which:

FIG. 1 is a side elevation in section of an outdoor enclosure for communications apparatus in accordance with this invention; and FIG. 2 is a graphical representation of the effectiveness of the enclosure of FIG. 1 in controlling the temperature therein.

FIG. 1 illustrates in vertical section an enclosure 10 for outdoor installations of communications apparatus 11 such as telephone repeaters and the like. Enclosure 10 comprises a housing 12 supported above ground by a post 13. The upper end of the post 13 extends into the housing 12 and has secured thereto a plate 14 on which the apparatus 11 is mounted. The lower end of the post 13 extends into the ground to a suitable depth as explained hereinafter and is terminated by a plate 15. A layer 16 of thermal insulation completely encloses the housing 12 and the post 13 below ground level to plate 15 as well as above ground level. A fluid impermeable skin 17, preferably of fibre glass, is disposed on the outer surface of the insulating layer 16 to prevent moisture from penetrating the insulation.

Usually the communications apparatus 11 is electrically connected to an underground transmission line. As shown in the drawing, the connection is established by an electrical conductor 18 passing through a passageway 19 in the insulating layer 16 around the post 13. The top of the housing 12 and the insulation thereon is removable to provide access to the apparatus 11.

The post 13 is made of a material having good heat conductivity such as aluminum, copper, bronze, magnesium or the like. Aluminum has been found to be a particular suitable material from the structural and economic point of view. The lower end of post 13 is imbedded in the ground to a sufficient depth for stability and to a point where the temperature of the ground is substantially unaffected by variations in the atmospheric temperature. In the case of low temperature applications, the post 13 is usually imbedded to below the depth of frost penetration.

The temperature inside the housing 12 tends to follow the atmospheric temperature outside the housing. This creates a temperature differential between the end of the post 13 in the housing 12 and the end in the ground which results in heat being conducted between the housing 12 and the ground through the post 13. Due to this heat flow, the temperature of the ground has a stabilizing effect on the temperature inside housing 12 whereby the latter does not fluctuate as greatly as the atmospheric temperature. This applies to seasonal as well as diurnal temperature variations. So long as a temperature differential exists along the post 13, the conduction of heat through the post will maintain the temperature in the housing 12 between the atmospheric temperature and the ground temperature at the bottom end of the post 13.

The insulating layer 16 along the post 13 minimizes losses to the surroundings of heat being conducted by the post. Transfer of heat to and from the post 13 is enhanced by the metal plates 14 and 15 attached to the ends thereof and preferably of the same material as the post. Mounting the apparatus 11 directly on plate 14 in the housing 12 subjects the apparatus to direct heat transfer to and from the post 13 for optimum temperature control.

The graph in FIG. 2 illustrates a comparative temperature test of a telephone repeater housing mounted on a heat-conducting aluminum post in the manner shown in FIG. 1 and an identical housing supported by a wooden post which is effectively not heat conducting. The aluminum post was imbedded in the ground to a depth of six feet where the temperature was relatively stable and substantially unaffected by fluctuations in the atmospheric temperature above ground. A seven-watt heater was installed in each housing to simulate the heat that would be generated by the operation of telephone repeater apparatus that would normally be installed in the housing.

The test was conducted in the winter, and during the nine-day period illustrated in FIG. 2, the atmospheric temperature represented by curve A varied from a low of 0° F. to a high of 49° F. The temperature of the ground at the bottom of the aluminum post as represented by curve B stayed at a fairly constant average of 46° F. and varied only 6 degrees over the entire period.

The temperature in the housing mounted on the aluminum post is shown by curve C while curve D gives the temperatures that were measured in the housing on the wooden post. As can be seen from curve D, there is a natural tendency for the temperature in the housing to be slightly higher than the prevailing atmospheric temperature. The reason for this is two-fold: the heat generated by the equipment in the housing which in the test case was simulated by the seven-watt heater, and the normal sun load created by the direct rays of the sun falling on the exterior of the housing.

A comparison of curves C and D shows quite clearly that the heat-conducting aluminum post has a definite moderating effect on the temperature in the housing as compared to the substantially heat-insulating wooden post. The lowest temperature recorded in the housing on the aluminum post was 38° F. and the highest temperature was 78° F. for a maximum fluctuation of 40 degrees during the test period. On the other hand, the temperature in the housing on the wooden post varied from 9° F. to 66° F. for a total variation of 57 degrees. Thus, the heat conducted by the aluminum post due to the temperature differential between its ends stabilized the temperature within the housing by reducing the fluctuation to the extent of 17 degrees as compared to the other housing and 9 degrees over atmospheric conditions.

It is also evident from the graph of FIG. 2 that the heat conducted by the aluminum post kept the temperatures in the housing from falling to the low values measured in the other housing. It must be noted, however, that the temperature sensing thermocouple in the housing on the aluminum post was positioned closer to the heater than in the other housing. The effect of this is that the temperatures of curve C are from 3 to 5° F. higher than if the thermocouple had been placed in exactly the same location as in the other housing. Nevertheless, even if the values of curve C were reduced accordingly, it would still be quite evident that the aluminum post conducts sufficient heat to the housing to keep the temperature well above the atmospheric temperature and also above that in a housing not having such source of additional heat.

Although similar tests have not been conducted under high atmospheric temperatures experienced in summer, isolated instances indicate that the aluminum post extracts heat from the housing due to lower-than-atmospheric temperatures in the ground to reduce the temperature fluctuations and maintain lower temperatures than the same housing would without the aluminum post.

The degree to which the temperature in the housing can be moderated by conducting heat between the housing and the ground, or any other suitable medium, in accordance with this invention has been found sufficiently adequate to permit installation of temperature sensitive communications apparatus under conditions of extreme heat and cold which would otherwise require some conventional and expensive means for heating and/or cooling the housing to maintain the environmental temperature of the apparatus within acceptable limits.

Numerous variations of this invention will become readily apparent to those skilled in the art. In the disclosed embodiment, the heat conducting post 13 also supports the housing 12; of course, the housing could be supported by independent support means while the post 13 or any suitable heat conducting member would simply extend between the housing and the controlling medium. While the most readily available medium is the ground, any suitable medium, such as a body of water, could also be used so long as its temperature will have the desired controlling effect on the temperature inside the housing 12.

Another aspect of the disclosed embodiment which can be altered within the purview of the invention is the housing 12. This is shown as a container covered with insulation which is in turn covered with the impermeable skin 17. If the skin 17 is sufficiently rigid, such as in the case of fibre glass, the skin and the insulating layer 16 are adequate to form the housing without the need of the inner structure identified in the description and FIG. 1 as the housing 12.

These and many other modifications of the preferred embodiment of the invention disclosed herein are within the expected skills of persons familiar with this field of technology and fall within the scope of the invention as defined in the appended claims.

What is claimed is:

1. An enclosure controlling the environmental temperature of outdoor installations of communications apparatus comprising a housing, said apparatus being mounted in the housing, a member of heat conducting material having one portion communicating with the interior of the housing and having another portion extending into a natural medium of less extreme temperature conditions than the atmosphere surrounding the housing, and means thermally insulating the member from its surroundings intermediate said portions, the member being continuous from said one portion to said other portion so as to conduct heat from the housing to the medium when the temperature in the housing rises above the temperature of the medium and to conduct heat to the housing from the medium when the temperature in the housing falls below the temperature of the medium whereby to control the effects of atmospheric conditions on the environmental temperature of the apparatus in the housing.

2. An enclosure as defined in claim 1 wherein the heat conducting material is selected from the group consisting of aluminum, copper, bronze and magnesium.

3. An enclosure as defined in claim 1 wherein said member supports the housing above ground and extends into the ground to a depth where the temperature of the ground is relatively unaffected by atmospheric conditions.

4. An enclosure as defined in claim 3 wherein said member extends into the ground to below the frost line.

5. An enclosure as defined in claim 3 wherein the heat conducting material is selected from the group consisting of aluminum, copper, bronze and magnesium.

6. An enclosure as defined in claim 3 including a layer of thermal insulating enclosing the housing.

7. An enclosure controlling the environmental temperature of outdoor installations of communications apparatus comprising a housing, said apparatus being mounted in the housing, an aluminum post supporting the housing above ground having one end in communication with the interior of the housing and having the other end extending into the ground below the frost line to a depth where the temperature of the ground is relatively unaffected by atmospheric conditions above ground, means for enhancing the transfer of heat to and from the ends of the post, and a layer of thermal insulation covering the post between the ends thereof, the post controlling the effects of atmospheric conditions on the environmental temperature of the apparatus in the housing by conducting heat from the housing to the ground when the temperature in the housing rises above the temperature of the ground at said other end of the post and by conducting heat to the housing from the ground when the temperature in the housing falls below the temperature in the ground at said other end of the post.

8. An enclosure as defined in claim 7 wherein the means for enhancing the radiation of heat to and from the post comprises a metal plate larger in area than the cross section of the post secured to each end thereof.

9. An enclosure as defined in claim 8 wherein the metal plate secured to each end of the post is aluminum.

10. An enclosure as defined in claim 8 wherein said communications apparatus is mounted on the plate secured to the end of the post within the housing.

11. An enclosure as defined in claim 7 including a layer of thermal insulation covering the housing and a moisture-impermeable skin disposed on the outer surfaces of the insulation on the post and the housing.

References Cited

UNITED STATES PATENTS

| | | | |
|---|---|---|---|
| 1,703,803 | 2/1929 | Widstrom | 236—19 X |
| 1,977,731 | 10/1934 | Masury | 165—185 X |
| 1,995,355 | 3/1935 | Koerner | 236—1 |
| 2,395,757 | 2/1946 | Peters | 165—185 X |
| 3,177,933 | 4/1965 | Webb | 236—1 X |
| 3,195,619 | 7/1965 | Tippman | 62—260 X |
| 3,229,755 | 1/1966 | Komarow | 236—1 X |
| 3,244,371 | 4/1966 | Bishop | 236—1 |

ROBERT A. O'LEARY, *Primary Examiner.*

M. A. ANTONAKAS, *Assistant Examiner.*